UNITED STATES PATENT OFFICE.

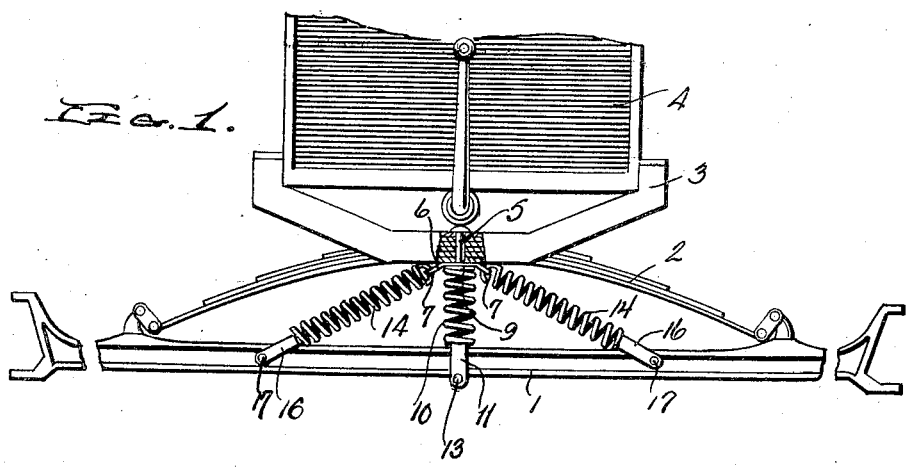
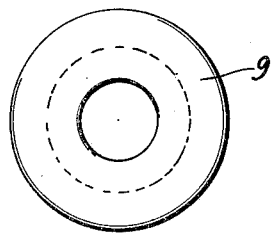
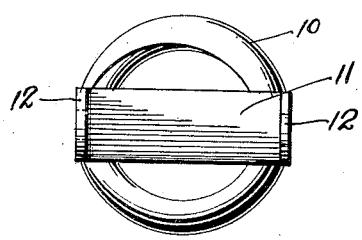
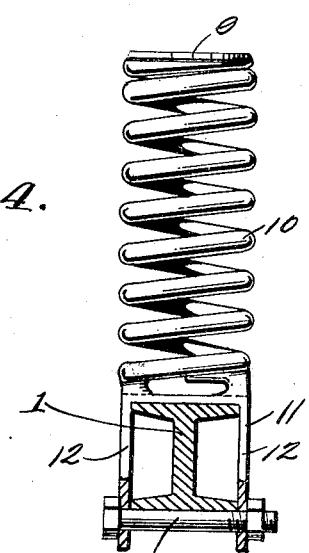
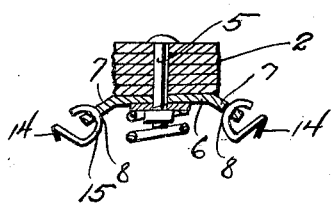

WILLIAM F. CAULEY, OF WADE, MISSISSIPPI.

AUTOMOBILE-SPRING.

1,338,673.  Specification of Letters Patent.  Patented May 4, 1920.

Application filed July 11, 1919. Serial No. 310,184.

*To all whom it may concern:*

Be it known that I, WILLIAM F. CAULEY, a citizen of the United States, residing at Wade, in the county of Jackson and State of Mississippi, have invented certain new and useful Improvements in Automobile-Springs, of which the following is a specification.

This invention relates to automobile springs and more particularly to an attachment especially adapted for use on Ford automobiles.

The primary object of the invention is to provide coil springs connected to the front axle and the forward end of the frame beneath the radiator so that excessive strain of the automobile structure at the front thereof will be prevented when the automobile is traveling over rough roads.

Another object is to provide a supplementary spring means to coöperate with the front leaf springs of the automobile whereby the supplementary springs will tend to maintain the radiator vertically during movement of the axle into and out of inclined position as when the wheel at one side of the vehicle is disposed in a plane lower than the wheel at the opposite side of the vehicle.

The above and additional objects are accomplished by such means as are illustrated in the preferred embodiment and in the accompanying drawings, wherein like characters denote like or corresponding parts throughout the several views, in which:—

Figure 1 is a front elevation of a portion of the automobile structure showing my invention applied thereto.

Fig. 2 is a plan view of one of the spring elements.

Fig. 3 is a bottom plan view of the same spring element,

Fig. 4 is an enlarged side elevation of the central spring elements showing its application to the front axle and Fig. 5 is an enlarged detail section showing the connection for the spring to the vehicle frame.

Referring to the drawings wherein is illustrated the preferred form of my invention, in which like numerals of reference indicate like or corresponding parts throughout the several views, the front axle 1 is connected to the front spring 2 in the usual manner, the spring supporting the front portion 3 of the frame upon which the radiator 4 is mounted. Extending through the leaf springs 2 at the center thereof is a bolt 5 which retains in position a plate 6 the same having a central opening through which the bolt 5 is extended whereby the plate 6 is firmly fixed to the central portions of the springs 2. Each end of the plate is provided with an angularly disposed ear 7 having an opening 8 formed therein. The bolt 5 also secures in position a circular plate 9 which forms a part of the central upright supporting springs 10. The plate 9 is welded or otherwise rigidly secured to one end of the coil spring 10 and the opposite end of the spring 10 has welded thereto a yoke 11 which provides a bracket to secure the opposite end of the spring to the front axle 1. This yoke comprises the parallel arms 12 which embrace opposite sides of the front axle as shown in detail in Fig. 4 and the lower ends of the arms 12 are provided with openings through which a fastening bolt 13 is projected whereby the same may engage the bottom of the axle as shown to retain the yoke member in position whereby the coil spring 10 will be rigidly held in position between the axle and the central portion of the leaf spring as shown in Fig. 1.

Secured to each ear 7 is a coil spring 14 which has one end formed into a loop 15 adapted to be inserted through one of the openings 8. The opposite end of each spring 14 is provided with a yoke member 16, in exactly the same manner as the yoke 11 is formed. These yokes, however, are secured to the front axle by fastening pins 17 passing through openings in the ends of the yoke and also through conveniently located holes in the front axle. These holes are located equi-distant from the central portion of the axle and each hole is approximately midway between the center of the axle and the point at which one end of the spring 2 is secured to the axle so that the springs 14 are extended in an angular direction as shown to advantage in Fig. 1. Lateral swaying and swinging of the machine therefore, is materially reduced and since the springs are all connected to the central portion of the structure it will be obvious that tilting movement of the front axle will not cause tilting movement of the radiator since the springs will tend to maintain the radiator in an approximately horizontal position at all times regardless of the contour of the road over which the machine is traveling.

The foregoing description and accompanying drawings have reference to what might be considered to be the approved or preferred form of my invention. I desire it to be understood that I may make such changes in construction, combination and arrangement of parts, materials, dimensions, et cetera, as may prove expedient and fall within the scope of the appended claims.

Having thus fully described my invention what I claim as new and desire to secure by Letters Patent, is:—

1. In combination with the front axle and leaf springs of an automobile, a central vertical coil spring equipped with a yoke embracing the central portion of the axle and having its opposite end secured to a fastening bolt, a plate retained in position by the said fastening bolt against the said automobile spring, and equipped with lugs, angularly extending springs secured to the lugs, each angularly extending spring being provided with a yoke secured to the said axle at a point midway between the center thereof and the point at which one end of the said leaf spring is secured to the axle.

2. In combination with the front axle and leaf springs of an automobile, a pair of angularly disposed springs, a retaining plate secured to the central portion of the said leaf springs and provided with lugs adapted to engage the said angularly disposed springs, each spring being provided with a yoke at its lower end joined to the said axle, at points spaced in opposite directions from the center of the axle, and resilient means interposed between the said retaining plate and the central portion of the said axle.

In testimony whereof I affix my signature in presence of two witnesses.

WILLIAM F. CAULEY.

Witnesses:
RAY D. McLEOD,
JOE FISHER.